TEMPERATURE DISTRIBUTIONS WITHOUT, (a), & WITH, (b) PELTIER EFFECT

RATE PROGRAM FOR N-p-n-P JUNCTION

INVENTOR
W. G. PFANN
BY
George S. Indig
ATTORNEY

INVENTOR
W. G. PFANN
BY
George S. Indig
ATTORNEY

United States Patent Office 3,086,857 Patented Apr. 23, 1963

3,086,857

METHOD OF CONTROLLING LIQUID-SOLID INTERFACES BY PELTIER HEAT

William G. Pfann, Far Hills, N.J., assignor to Bell Telephone Laboratories, Incorporated, New York, N.Y., a corporation of New York Filed Jan. 23, 1957, Ser. No. 635,893
1 Claim. (Cl. 75—10)

This invention relates to processes for controlling the position and/or motion of liquid solid interfaces. Specific embodiments of the processes of the present invention include their use in the refining and crystallizing of semiconductor materials and in the manufacture of semiconductor translating devices such, for example, as junction type transistors utilizing such semiconductive materials.

The development of semiconductor translating devices such as point and junction type diodes and transistors and the resultant demand for large quantities of semiconductive materials of a very high controlled purity level and crystalline perfection and for such materials having very accurately controlled resistivity gradients and/or p-n junctions of precise characteristics and spacing has resulted in tremendous demands being made on the metallurgical profession to meet these needs. In response to these demands there have been developed over the past few years commercial processing techniques, the use of which results in materials having impurity levels of such small magnitude and impurity gradients of such precision as were previously unobtainable even by the most careful laboratory methods. Such processes include; zone-refining by which almost unmeasurable impurity levels may be obtained; zone-leveling by which such impurity levels may be maintained uniform over the length of a growing crystal; rate-growing by the use of which p-n junctions may be produced in semiconductor systems merely by changing the rate of growth of a growing crystal containing carefully selected and regulated significant impurities; temperature gradient zone-melting by the use of which the composition and crystalline nature of a fusible system may be altered in accordance with the most exacting demands; and crystal pulling by the use of which highly perfect crystals may be grown from a melt. Each of these processes is finding increasing use particularly in the processing of semiconductive materials and in the production of semiconductor translating devices, the mass production of which was virtually unimaginable a decade ago.

All of the above processes involve the use of one or more solid-liquid interfaces between molten and solid phases of the materials undergoing processing and all have the characteristic in common that the success of their operation is completely dependent upon the degree of accuracy with which such interfaces may be controlled both as to position and rate of progression. For example, failure in maintaining the rate of progression of such an interface absolutely constant in either a zone-leveling or a crystal pulling procedure results in a corresponding variation in the effective distribution coefficient of any solutes of concern in materials undergoing treatment by such processes with a resulting variation in segregation of such solutes in the crystallizing material. Where it is desirable to produce a concentration gradient of such solutes in the crystallizing material whether such gradient is the product of a variation in concentration in the liquid phase as, for example, in a remelt process, or whether it is due to a design variation in the rate of progression of a solid liquid interface as in the rate-growing process, any deviation in progression rate or change of progression rate results in a deviation of concentration gradient in the final product. In a species of zone-melting sometimes referred to as the "floating zone technique" in which a moving molten zone is retained in position in a vertically disposed ingot solely by virtue of cohesive and adhesive forces within the zone and between the zone and the solid portion of the ingot, and wherein retention of the zone is dependent upon very close control of the volume of the molten portion an erratic variation in the rate of progression of either or both interfaces may result in an instability in the zone itself sufficient to undesirably affect the dimensions of the finished product or even to cause escape of the zone itself.

In all of the above processes there has been increasing need felt for an accurate method of controlling liquid-solid interfaces and for maintaining such control means as nearly as possible instantaneously. It has long been known that the position and rate of progression of such an interface may be controlled by use of increasingly steep temperature gradients from the molten to the solid phases across such interfaces. However, where such steep temperature gradients are utilized, their use is frequently attended by other difficulties. For example, in rate-growing, where the final junction-containing semiconductive body is to be used without further recrystallization, the use of steep temperature gradients generally results in undue crystalline strain on the crystallizing portion such as to cause crystalline imperfections undesirable from an electric standpoint.

In accordance with this invention extremely accurate control is gained over liquid-solid interfaces in such processes and in others without the use of unusually steep temperatures gradients. Such control is gained without appreciable time delay. The processes herein may be operated manually and are also adaptable to use in automation systems in which control over such interfaces is obtained without human attendance.

In accordance with this invention a direct current is passed across a liquid-solid interface of a system undergoing treatment, the current being of such direction and magnitude and the system being of such nature that heat is either generated or absorbed as desired at the interface by reason of the Peltier effect resulting from such a current passing through an interface from one phase to another. For practical reasons the processes herein are limited to operation upon systems having interphasal Peltier coefficients of at least 0.005 volt between the solid and the liquid phase regardless of sign. Such systems include all of the commonly known extrinsic semiconductor systems such as germanium, silicon and compounds of the Group III–Group V elements of the Periodic Table according to Mendelyeev and also include other materials such, for example, as bismuth. The direction of such direct-current flow across such an interface may be constant so as to maintain such an interface in fixed position, so as to maintain its rate of progression constant, or to vary the rate of progression in a predictable manner by reason of other influence; or may be varied as to magnitude and/or direction to vary the amount of heat absorbed or generated at the interface for the purpose, for example, of creating resistivity gradients or producing p-n junctions in semiconductor systems. These and other uses of the processes herein will be described.

To aid in the description of this invention use will be had of standardized terminology and symbols. In this description "Peltier current" is that direct current actually passing through a solid-liquid interface under study which results in the generation or absorption of heat due to the Peltier coefficient of the material under treatment between the solid and liquid interface. The terminology "Peltier heat" or "Peltier heating" has reference either to generation or absorption of heat at such an interface while the terminology "Peltier cooling" has reference only to absorption of heat at such an interface. The effect of heating or cooling due to such Peltier current is also referred to as "Peltier effect." Although the complete symbol for the Peltier coefficient between the solid and liquid phases is ${}_sP_l$, for simplicity, use is here made of the abbreviated symbol P which for the purposes of this description has the identical meaning. In describing this invention, Peltier coefficient P is considered to be positive when heat is absorbed due to the Peltier effect with the solid material positive with respect to the liquid at the interface under study.

In discussing this invention cognizance will be taken of the effect of Joule heating which necessarily accompanies Peltier heating to some extent. The influence of such Joule heating will be assessed and means for avoiding its effects will be discussed.

An understanding of this invention will be facilitated by reference to the following figures in which.

Figure 3:
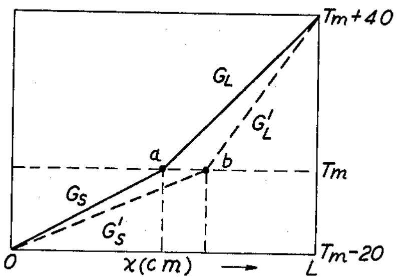
Figures 4A, 4B:
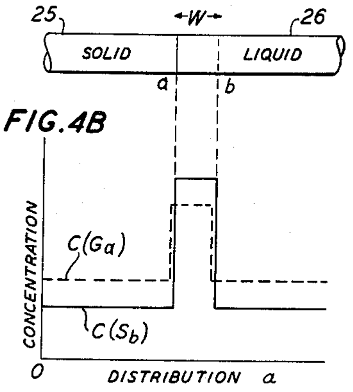
Figure 5:
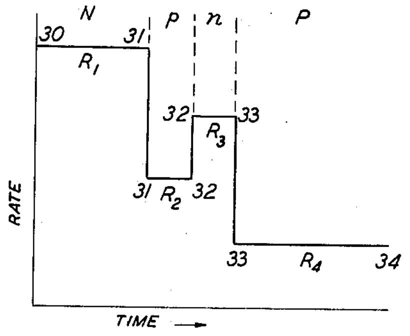

FIG. 3 on coordinates of temperature against distance is a plot showing temperature distributions on either side of a liquid-solid interface with and without Peltier effect under a given set of conditions;

FIGS. 4A and 4B depict respectively a schematic front elevational view of a body undergoing treatment by a zone-melting or a crystal-pulling technique in which concentration gradients of solutes are produced by changes in magnitude or direction of Peltier current and FIG. 4B on coordinates of concentration against distance is a plot showing the concentration levels of two opposite type significant impurities in a body of semiconductive material such as that of FIG. 4A after processing in which a reversal of Peltier current was utilized in the production of a p-n-p junction;

FIG. 5 on coordinates of rate of progression of a solid-liquid interface against time is a plot to which reference will be made in describing a Peltier program for producing an N-p-n-P junction in a semiconductive material.

Figure 6A:
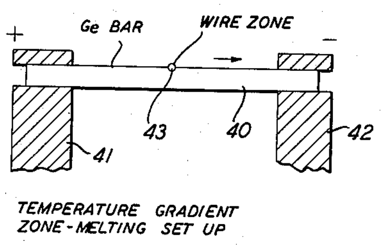
Figure 6B:
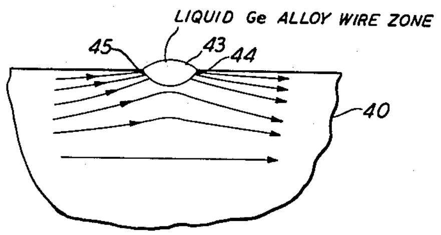
Figure 7A:
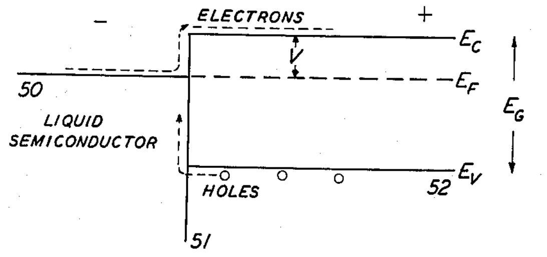
Figure 7B:
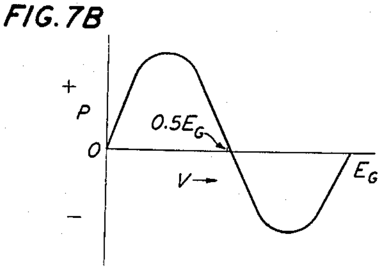

FIGS. 6A and 6B are, respectively, a schematic front elevation view of apparatus and material undergoing processing wherein a wire zone is caused to progress along the surface of an ingot by a species of temperature gradient zone-melting in which the temperature gradient is produced by Peltier current, and FIG. 6B is a schematic view of a section of the ingot of FIG. 6A containing the wire zone of that figure and showing the path and density of current responsible for generation or absorption of heat due to Peltier current; and FIGS. 7A and 7B are, respectively, an energy diagram for a semiconductor system showing both liquid and solid phases and FIG. 7B is a plot showing the variation of Peltier coefficient with the energy difference between the bottom of the conduction band and the Fermi level. Reference will be had to FIGS. 7A and 7B in a theoretical discussion herein.

Referring again to FIG. 1 ingot 1 which may, for example, be n-type germanium of a resistivity of about 0.05 ohm-centimeter at room temperature, of a length of about 20 centimeters and having a cross-sectional area of 1.5 square centimeters is contained in boat 2. Under the influence of heater ring 3 which may, for example, be a resistance-heated graphite ring, molten zone 4 having liquid-solid interfaces 5 and 6 between solid portions 7 and 8 is produced. By means of molybdenum leads 9 and 10 which may be frozen into solid portions 7 and 8 and which are then connected with a source of direct current not shown, a direct current is passed through the ingot 1 so as to pass through both interfaces 5 and 6. This apparatus may be used for any of the zone-melting processes described in United States Patent 2,739,088 for refining, leveling, rate-growing and other purposes set forth therein and known to those skilled in the art.

The magnitude of the Peltier effect was studied on apparatus such as that depicted on FIG. 1 in the following manner. Working with an ingot 1 of n-type germanium of the dimensions set forth in the preceding paragraph and with a molten zone of a length of about 7 centimeters, a direct current was first passed through ingot 1 by means of leads 9 and 10 and the whole system was allowed to come to equilibrium. Once the interfaces 5 and 6 had come to a complete standstill, the current was quickly reversed in direction and the movement of the interfaces 5 and 6 were observed with a microscope. It was found that for a current density of 20 amperes per square centimeter, the rate of interface movement was about 0.003 centimeter per second for either interface 5 or 6. This rate is comparable to those ordinarily used in growing single crystals of germanium. The temperature gradient at either interface was estimated to be about 50° C. per centimeter. The reversal scheme was used to separate the effect of Joule heating from that of Peltier heating. Reversing the polarity of a current of constant magnitude has no effect on the amount of Joule heating while the Peltier effect is reversed.

For the n-type germanium system under study which contained as solute approximately 10 parts per million of antimony, for the direction of current flow shown the Peltier coefficient P is positive, so that both interfaces 5 and 6 move away from positive lead 9, thereby indicating simultaneous Peltier cooling at interface 5 and Peltier heating at interface 6.

As will be discussed, the Peltier effect may be utilized in apparatus such as that of FIG. 2 for the purpose, not only of controlling the position of a liquid-solid interface or of varying such position without time lapse, either for correcting an undesired deviation or for producing a desired variation in solute concentration in the freezing material, but may also be used as the primary influence producing movement of such an interface.

Figure 2:
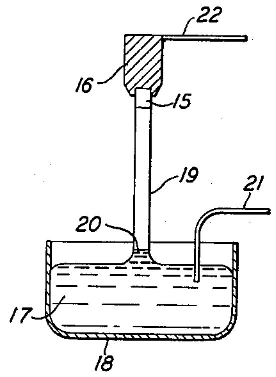
FIG. 2 is a schematic front elevational view of a crystal pulling apparatus and material undergoing treatment in which the liquid-solid interface is accurately positioned by Peltier heat.

The crystal-pulling apparatus shown schematically in FIG. 2 may be utilized in any of the manners described in United States Patent 2,768,914 and for other purposes known to workers in the field. In such apparatus a seed crystal 15 held, for example, by a chuck 16 is dipped into a melt of material 17 retained in a crucible 18 heated to the melting point of the material of melt 17 by heating means not shown. After seed crystal 15 reaches equilibrium with the surface of melt 17 it is drawn slowly upwards by mechanical means not shown at such a rate as to draw with it crystallizing material 19. During drawing passage of Peltier current through liquid-solid interface 20 by means of electrode 21 and lead 22 attached to a source of direct current not shown is used to control and/or to move interface 20 in the manner described herein. If crucible 18 is electrically conductive, electrode 21 may be dispersed with. As will be set forth such Peltier current may be used merely for maintaining the growth rate of crystalline material 19 constant so as to assure a constant concentration of solute in such material and so as to assure an attendant regularity of resistivity level or may be utilized for producing any change in concentration gradient so as to result either in a desired resistivity gradient of a given conductivity type or a change in conductivity type in the preparation of single or multiple p-n junctions.

The effect of the passage of Peltier current on temperature distributions is discussed in connection with FIG. 3. For the purpose of this discussion, heat flow is assumed to be one-dimensional and by conduction only. This figure is a plot on coordinates of temperature in degrees centigrade against distance, $x$, in centimeters, along a cylindrical ingot undergoing treatment by a single liquid interface process such, for example, as normal freezing. The plotted data is for such a system in which the temperatures and positions of a heat source at $x=L$ and a heat sink at $x=O$ are fixed and the crystal is stationary. The temperature of the ingot at the heat source at position L is equal to the melting temperature plus 40° C. ($T_m+40$) and the temperature in the ingot at position O is 20 degrees below the melting temperature or $T_m-20$. With no current passing through the ingot the liquid-solid interface assumes an equilibrium position at $x=a$ and at which the net heat flux to the interface is zero (temperature gradient under these conditions shown by the solid curve). The equation for such a condition is given as follows:

$$k_sG_s-k_lG_l=0 \quad (1)$$

in which $k$=thermal conductivity in c.g.s. units;
$G$=value of temperature gradient in degrees centigrade per centimeter;
Subscript $s$ indicates value in solid phase; and
Subscript $l$ indicates value in liquid phase.

In the system plotted the thermal conductivity in the solid phase is twice that in the liquid phase or $$k_s=2k_l$$

Passage of current through the interface in a direction such as to cause an absorption of heat at the interface results in a movement of the interface to the right to a stationary position such, for example, as position $b$ resulting in the temperature gradient shown by the dotted line. Under this condition the increased heat flux in the liquid due to the increased temperature gradient, $G_l'$, and the decreased heat flux in the solid phase due to $G_s'$ leave a net heat flux equal and opposite to the magnitude of heat absorbed through the Peltier effect. This condition may be expressed as follows:

$$Pj+k_sG_s'-k_lG_l'=0 \quad (2)$$

in which

P as discussed is an abbreviation of $\rho P_l$ and equals the interphasal Peltier coefficient expressed in volts
$j$=positive current density in amperes per square centimeter, the positive direction in this instance being defined as that direction of current flow with the solid portion of the ingot biased positive with respect to the liquid portion.

The distance, $ab$, of solid-liquid interface travel in FIG. 3 is calculated for one material system and a given set of conditions in the following illustrative example.

*Illustrative Example 1*

Let $k_s$=0.2 gram-calorie per centimeter squared per degree centigrade per second
$k_l$=0.1 gram-calorie per centimeter squared per degree centigrade per second
$T_l-T_m$=40° C.=the difference between the temperature in the ingot at the position of the heat source and the melting temperature
$T_m-T_o$=20° C.=the difference between the temperature in the ingot at position O and the melting temperature equals 20° C.
$L$=16 centimeters Assuming linear temperature gradients, $T_m$ occurs at position $x=8$ centimeters, the midpoint of the rod when no current flows across the interface. This condition corresponds to a temperature gradient in the liquid of 5° C. per centimeter, a temperature gradient in the solid of 2.5° C. per centimeter and to the heat fluxes $$k_lG_l=k_sG_s=0.5$$

calorie per second.

It is next assumed that sufficient current of the proper direction is caused to flow through the interface to result in an absorption of heat and a movement of the interface 2 centimeters to the right to position $b$. Under these conditions the temperature gradient in the liquid portion of the ingot, $G_l'$, equal 6.67° C. per centimeter and the temperature gradient in the solid portion of the ingot $G_s'$ equals 2.00° C. per centimeter. From Equation 2 the net heat flux equals P$j$.

Thus, $$Pj=k_l'G_l'-k_s'G_s'=(0.1)(6.67)-(0.2)(2.0) =0.267 \text{ calorie per second}=1.12 \text{ watts}$$

Assuming a value for the Peltier coefficient of 0.2 volt which is the approximate empirical value thus far obtained for n-type germanium, this value of P$j$, which produced a movement of two centimeters corresponds to a current density, $j$, of +5.6 amperes per square centimeter.

The influence of overall temperature gradient across the ingot is readily seen from the above. For example, if in the above calculation the temperature gradients in both phases are multiplied by 6 so that $G_l$=30° C. per centimeter, then six times the current or a current density $j$=33.6 amperes per square centimeter is required to produce the same overall movement of two centimeters.

FIGS. 4A and 4B are illustrative of a Peltier heat process for producing p-n junctions in fusible semiconductor systems in which conductivity type is affected by the amount and type of significant impurity contained therein. This application of Peltier heat is related to the well-known procedure usually referred to as "rate growing." In rate growing, use is made of the variation in segregation coefficients of at least two significant impurities of opposite conductivity inducing types with the rate of growth of material at a freezing interface. The process involves preparing a semiconductor material containing at least two such significant impurities of such concentrations that due to the variation in segregation coefficient one of the impurities predominates in the freezing material at a given rate of crystallization while the other predominates at a different rate of crystallization. To produce a sharp demarcation between the two crystallized portions of opposite conductivity types, a procedure known as "melt-back" is utilized. In accordance with this procedure, when it is desired to change conductivity types, the growth direction is actually reversed by melting back a thin layer and subsequently reversing the direction of growth so as to grow in the forward direction at a rate such as to favor the opposite impurity. Suitable acceptor and donor materials for a germanium system are gallium and antimony, respectively. Rates and compositions may be prescribed for a range of excess concentrations at crossover points. Use of the rate growing process may result in good n-p-n junctions of satisfactory characteristics for many uses. The process is, however, not considered adaptable to the production of p-n-p junctions in germanium suitable for use in transistors.

Use of Peltier current pulses in similar systems may result in either p-n-p or n-p-n junctions by a rather similar mechanism but with much better control. The center region of such a junction may be 0.3 mil in thickness or greater or smaller as desired. Production of a p-n-p junction in germanium containing gallium and antimony is depicted schematically in FIGS. 4A and 4B. In accordance with FIG. 4A solid crystallizing material 25 is being grown from a melt 26 which may be of large volume as in a crystal-pulling process or of comparatively small volume as the molten zone in a zone-melting process. Corresponding plot 4B is on coordinates of concentration of significant solute, either gallium or antimony, against distance $x$ which may be in any convenient units. The portion of the crystallizing material 25 corresponding with the length from $x=O$ to $x=a$ is grown at a slow rate such, for example, as about 0.0005 centimeter per second so as to favor gallium resulting in p-type conductivity over this portion of the solid material. At position *a* a freezing pulse of Peltier current is applied for time $W/v$ thereby rapidly increasing the rate of growth such as to favor antimony and produce an n-type region of width W, where $v$ is the fast growth rate and is about 0.006 centimeter per second. The normal (mechanical) growth rate, in absence of Peltier heating may be about 0.003 centimeter per second. W may in a typical junction be about 0.3 mil or as desired. At position *b* the growth rate is again slow, the change being produced gradually or rapidly as desired with a Peltier current of opposite direction so as to enhance melting and produce a return to p-type material. Examples of concentrations and growth rates suitable in the preparation of such p-n-p junctions of desired resistivity levels and junction characteristics are available in the literature, see for example H. E. Bridges, Journal of Applied Physics, volume 27, page 746 (1956).

Although FIGS. 4A and 4B are in terms of the preparation of a p-n-p junction, it is recognized that the process is equally applicable for the preparation of n-p-n junctions. For example, using the same solutes discussed above an n-type region may first be produced by fast growth in a germanium system containing sufficient antimony so that impurity is in excess at that growth rate, then applying a melting pulse which, since time lag is not critical where melt-back is employed, may be produced by Joule heating by use of an alternating or direct current or a combination of the two, after which rapid freezing is produced by use of a high-current Peltier freezing pulse. The Peltier freezing pulse should be applied long enough to prevent later melt-back by the accompanying long-time constant Joule heating effect.

In the production of either p-n-p junctions or n-p-n junctions, extremely thin intermediate layers may result because of the rapid change in the growth rate producible through the Peltier effect. The ability to produce either p-n-p or n-p-n junctions with controllably thin intermediate layers using the same solute pair is a unique feature of this process and cannot be duplicated by conventional rate growing. Rate programs may be devised for growing multiple junctions. FIG. 5 on coordinates of rate of progression of a freezing liquid-solid interface on the ordinate against time on the abscissa is illustrative of such rate programs and is specific to the preparation of an N-p-n-P multiple junction where the capital letters denote high conductivity and the lower case letters denote low conductivity. The actual growth rates $R_1$, $R_2$, $R_3$ and $R_4$ are given in the following illustrative example. Two-terminal devices of this configuration are assuming increasing importance as on-off switching elements in crosspoint switching systems.

*Illustrative Example 2*

Starting with a melt containing, for example, 50 grams of germanium about $5.4\times10^{18}$ atoms per cubic centimeter of antimony and about $2.6\times10^{17}$ atoms per cubic centimeter of gallium, a seed crystal is dipped into the melt and allowed to come to thermal equilibrium with the melt. It is then withdrawn at a mechanical pull rate of 0.004 centimeter per second while being rotated at about 144 revolutions per minute. The enumerated concentrations of gallium and antimony are such that under these conditions of pull the crystal will be approximately compensated as to the concentrations of the two impurities so that electrical conductivity in the resultant crystal is intrinsic.

Maintaining the mechanical pull rate constant at the above value of 0.004 centimeter per second, the following growth rate program produced by applications of Peltier currents results in the production of N-p-n-P junction configuration in which the N- and P-regions have resistivities of about 0.1 ohm-centimeters and the n- and p-regions have resistivities of the order of 0.5 to 1.0 ohm-centimeter. The thickness of the intermediate n- and p-regions is of the order of 0.001 centimeter.

An N-region is first produced by growing at a rate $R_1$ of about 0.008 centimeter per second resulting from the use of a Peltier current $J_1$ of a density of about +40 amperes per square centimeter. The time required to produce this N-region 30, 31 is not critical it having been found that a period of about one minute is satisfactory. Small p-region 31, 32 is next produced by use of a Peltier current $K_2$ of current density −10 amperes per square centimeter resulting in a pull rate of about 0.003 centimeter per second. The time of application of Peltier current $J_2$ is about 0.33 second. Small n-region 31, 32 is now produced by reversing the direction of the Peltier current resulting in Peltier current $J_3$ of a current density of +10 amperes per square centimeter again for a time interval of about 0.33 second. Application of such a Peltier current $J_3$ results in a pull rate of about 0.005 centimeter per second. Finally, P-region 33, 34 is produced by use of a Peltier current $J_4$ of current density of about −35 amperes per square centimeter resulting in a pull rate of about 0.0005 centimeter per second. The time of application of Peltier current $J_4$ is not critical and may range from a period of about 30 seconds up to several minutes.

It will be noted that no melt-back step is included in Illustrative Example 2, the need for such a procedure being largely offset by the elimination of the time lag resulting from the use of Peltier heat as compared with other means of changing growth rate. However, should it prove desirable, design of a program including one or more melt-back steps as well as programs for producing other types of multiple junctions in other semiconductor systems is straightforward in accordance with this disclosure and the well-known rate-growing means.

FIG. 6A depicts a temperature gradient zone-melting procedure in which the temperature gradient is produced by the Peltier effect while FIG. 6B shows the resultant heat flows attendant upon such a procedure. In FIG. 6A an ingot 40 of material such as germanium undergoing treatment is clamped in end blocks 41 and 42 which serve also as plus and minus electrodes and are connected with a source of direct current not shown. Wire 43 containing a material which when added to the material of ingot 40 has the effect of reducing the melting point thereof is placed on top of ingot 40. A typical material which may be contained by wire 43 for a germanium ingot 40 is aluminum. Passage of a direct current through ingot 40 via electrodes 41 and 42 of sufficient magnitude to produce a molten region in the position of wire 43 by Joule heating and maintenance of such current flow results in a movement of the wire zone at 43 from left to right. Rate of movement so obtained in one specific germanium system is set forth in the following illustrative example.

*Illustrative Example 3*

A small bar of n-type germanium having a room temperature resistivity of about 0.020 ohm-centimeter and dimensions of 5 x 0.3 x 0.3 centimeters was set between electrodes such as electrodes 41 and 42 of FIG. 6A. An aluminum wire 0.012 centimeter in diameter was placed across the upper face of the bar. A direct current of 21 amperes was passed through the bar heating most of it by Joule heating to between 750 and 800° C., the aluminum alloyed with the germanium forming a molten wire zone which migrated along the rod at a rate of about 2.5 microns per second.

FIG. 6B shows a broken section of ingot 40 and an alloy zone at position 43 and also shows the direct-current lines resulting from the passage of current through such an ingot. It is seen from this figure that current enters and leaves such a wire zone more or less on opposite sides. As in other types of zone-melting utilizing Peltier heating, Peltier heat is evolved at one interface 44 and absorbed at the other interface 45 thereby creating a built-in temperature gradient that travels with the zone 43. Under the influence of such a temperature gradient zone 43 moves in accordance with the temperature gradient zone-melting principle set forth, for example, in Journal of Metals, volume 7, page 961, 1955, movement being in the direction of the hotter interface, in the instance shown, interface 44. In contrast with conventional temperature gradient zone-melting such as described in the article to which reference is had above, there is no overall temperature gradient along the entire ingot, the temperature gradient responsible for movement of the zone being substantially limited to the portion of ingot 40 between the interfaces 44 and 45 themselves. In fact, to illustrate the degree of control made possible by use of Peltier current, a temperature gradient zone such as that shown in FIG. 6A has actually been caused to move down an external temperature gradient of approximately 10° C. per centimeter.

The lines of current in FIG. 6B are shown converging on zone 43 because the electrical conductivity of liquid germanium is many times greater than that of the solid. It has been reported in the literature that the conductivity of liquid germanium is of the order of 15 times that of the solid with the liquid at the melting point, see Physical Review, volume 84, page 367, 1951. In accordance with Illustrative Example 3 above, the average current density is of the order of 200 amperes per square centimeter. In such an instance, the current density in a wire zone such as zone 43 of FIG. 6B is of the order of ten times greater or about 2000 amperes per square centimeter.

Since the direction of zone movement in Example 3 is in the direction of the negative electrode it is concluded that P is positive for solid germanium against liquid germanium containing about 30 atomic percent of aluminum. Similar experiments performed with wires of other materials indicated that P is negative for gold, platinum, palladium and nickel and that P is positive for aluminum, tin, antimony, copper, silver, bismuth, magnesium, tellurium and lead. It is noted that in these instances the metals of the higher melting point have a negative Peltier coefficient.

An expression for the velocity $v$ of interface movement caused by absorption or evolution of Peltier heat has been derived. The expression which takes account of any externally applied temperature gradient but which is idealized in the sense that Joule heating is disregarded follows.

$$v=\frac{(Pj/4.18)+(k_sG_s-k_lG_l)}{H+(C_l-C_s)T_m} \qquad (3)$$

in which $j$=current density in amperes per square centimeter
$k$=thermal conductivity in calories per second per square centimeter per degree C. per centimeter
$G$=temperature gradient in degrees C. per centimeter
$C$=heat capacity in calories per cubic centimeter
$T_m$=melting temperature in degree Kelvin, and
$H$=heat of fusion in calories per cubic centimeter A unit analysis of Equation 3 indicates that the factor 4.18 is the number of watt seconds per calorie. The convention of signs is such that if P is +, then $v$ is in the same direction as $j$ (the direction of $j$ being considered to be from + to − in accordance with conventional practice).

Equation 3 provides a method of determining the value of the Peltier coefficient P without knowledge of the magnitude of $k$ and G in either phase. If a system, either idealized or non-idealized, is permitted to come to equilibrium under the influence of Peltier heating as at position $b$ in FIG. 3, $v$=0 because from Equation 2 the Peltier heat is equal and opposite to the net thermal flux at the interface. The direction of current $j$ is now reversed so that the term P$j$ is also reversed. Under these conditions the temperature gradients remain unchanged momentarily and $v$ becomes at times 0.

$$v=\frac{-2Pj}{H^*} \qquad (4)$$

in which $$H^*=H+(C_l-C_s)T_m$$

As the interface continues to move the net heat flux changes so as to oppose the motion until it again becomes equal and opposite to the Peltier term. Thus, a plot of interface position against time will have a maximum slope at time 0 equal to $v$ in Equation 4. Therefore, Peltier coefficient P may be expressed as follows:

$$P=\frac{-4.18vH^*}{2j} \qquad (5)$$

Calculations of the value of the Peltier coefficient of several materials have been made by use of Equation 5. Such values which are considered to be of an accuracy of no better than + or −30 percent, which is the approximate accuracy of the instruments used, follows:

$P_{Bismuth}$= 0.013 volt
$P_{Germanium}$=0.2 volt

Figure 1:
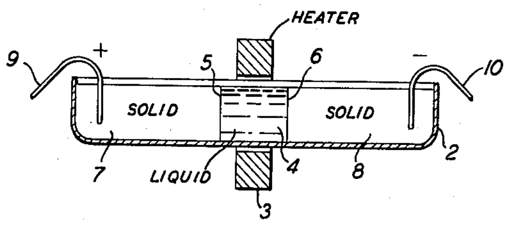
FIG. 1 is a schematic front elevational view of apparatus and material undergoing treatment in accordance with a zone-melting technique in which use is made of Peltier heat for controlling a liquid-solid interface.

The Peltier effect may also be useful in the growth of single crystals by use, for example, of the zone-melting apparatus of FIG. 1 or the crystal pulling apparatus of FIG. 2. In such use Peltier heating may be beneficial in two ways. First, a Peltier cooling current in absorbing heat at a freezing interface effectively reduces the heat of fusion so that less heat need be removed by conduction making higher growth rates possible for a given temperature gradient in the solid material. Second, Peltier current may serve as an instantaneous control means for preventing fluctuations in interface position in a growing crystal, thereby insuring freedom from fluctuations in solute concentration and from other crystalline imperfections that may arise from growth fluctuations.

The effectiveness of Peltier cooling current in effectively reducing the heat of fusion may be illustrated by reference to germanium. Germanium has a relatively large heat of fusion of about 605 calories per cubic centimeter which is generally considered to be one of the chief obstacles to rapid growth of perfect crystals of this material. Consider a liquid-solid interface in a cylindrical ingot at its equilibrium position in an impressed temperature gradient as at position $a$ in FIG. 3. At equilibrium the net thermal flux leaving the interface is 0. Neglecting lateral heat transfer, the velocity $v$ at which this ingot can be moved from the furnace without changing the temperature gradients in liquid and solid will be that at which Peltier cooling equals the liberated heat of fusion. Therefore, velocity per unit current density may be expressed as follows:

$$\frac{v}{j}=\frac{P}{(4.18)(H^*)} \qquad (6)$$

Substituting in Equation 6 the values for germanium of 0.2 volt for P and (112×5.4) calories per cubic centimeter for H*, there is attained a value of $v/j$ or velocity per unit current density of about $8\times10^{-5}$ centimeter per second.

In germanium use of a current density of 100 amperes per square centimeter which is close to a practical maximum for this material the pull rate may be increased by $v=8\times10^{-5}\times10^2$ or $8\times10^{-3}$ centimeters per second without appreciably varying the temperature gradient in the crystallizing material. Since the conventional growth rate for germanium is about $2.5\times10^{-3}$ centimeters per second this is equal to quadrupling the rate.

A very important advantage of the use of Peltier heat to eliminate fluctuations in interface movement of a growing crystal is the speed of response. In fact, as may be seen from the numerator of Equation 3, the very condition, low external temperature gradient, that results in poor response to other temperature controlling means favors the use of Peltier heat. This control means may be carried out manually or may be incorporated into an automatic monitoring system. Such an automatic system might, for example, utilize a fast-acting photosensitive element sensitive to the position of the liquid-solid interface together with conventional circuitry designed to vary the magnitude and reverse the direction of a Peltier current for effectively reducing small-scale fluctuations in freezing rate.

The description of the invention thus far, for the most part, neglects the effects of Joule heating necessarily accompanying Peltier heating. As will be shown Joule heating is generally of only minor importance at reasonable current density in the usual material undergoing processing. Even where the magnitude of Joule heating is of the same order of magnitude as Peltier heating, its effects can be obviated as will be shown.

The order of magnitude of Joule heating as compared with Peltier heating is seen from a discussion of a germanium system. In such a system the resistivity in the solid $\rho_S$ at the melting point is about $10^{-3}$ ohm-centimeter and the restivity in the liquid $\rho_l$ is about 1/15 of this value or about $7\times10^{-5}$ ohm-centimeter. Assuming a moderate current density $j$ of 20 amperes per square centimeter:

Peltier heat at interphase $=Pj=(0.2)(20)=4$ watts
Joule heat in solid within 1 centimeter of interface $=j^2\rho_S=0.4$ watt Assuming that an appreciable portion of this Joule heat generated flows to the interface, its influence is still minor compared to Peltier heating at this value of $j$. The proportion of Joule heat in the solid that does flow to the interface will decrease with increasing applied temperature gradient. Due to the comparatively low resistivity in the liquid, the Joule heat generated in the liquid phase is generally negligible.

As the current density $j$ increases the relative influence of Joule heat increases since Joule heat is proportional to $j^2$ and Peltier heat is proportional only to the first power of $j$. In melting back, Joule heat can aid Peltier heat. In freezing, however, heat absorbed through Peltier effect is somewhat offset by generation of heat through Joule heating.

Where it is desired to completely isolate the two effects due to the passage of current, that is, the effect of Joule heating and that of Peltier heating, this may be done by including an alternating-current component $j_a+a$ direct-current component $j$ such that their sum $j_T$ is at all times constant. In this way, Julie heating which may be brought about either by use of alternating or direct current and is dependent only on $j_T$ may be kept constant while $j$ results in the desired Peltier effect. In such a system it may be necessary to take into account any effect that motion of a liquid-solid interface may have on the Joule heat balance through a variation in the proportional amounts of liquid and solid material. Generally, however, such effects are small for small interface movements and may be neglected.

Even assuming the magnitude of Joule heating to be undesirably large, its associated time delay may permit operations such as formation of n–p–n junctions by Peltier heating pulses to be completed before the effect of Joule heating can be felt at the interface.

The Peltier coefficient P may be defined as follows:

$$P=\frac{Q}{it} \qquad (7)$$

where Q is the heat evolved at the interface when current $i$ flows per time $t$.

If $Q$ is expressed in joules
$i$ in amperes, and
$t$ in seconds
$P$ is in units of volts.

As previously discussed a positive sign for P is taken to mean that heat is absorbed when the solid phase is positive with respect to the liquid at the interface. Semiconductive materials differ from other types of materials in that they have energy gaps. The abrupt change in the energy level of an electron moving from a liquid phase of a semiconductor, in which it is at, or close to, the Fermi level, to the generally vastly different value in the solid phase, dependent upon the energy gap of the semiconductive material under study, and the conductivity type of the particular specimen under treatment results in a strong absorption or evolution of energy (or heat) by the moving electron. This abrupt change in energy level of electrons arising from the existence of an energy gap in the solid semiconductor is the main factor in determining the value of the Peltier coefficient for such a material.

FIG. 7A is an energy level diagram for a liquid semiconductor against solid n-type semiconductor. $E_F$ denotes the Fermi level where $E_c$ denotes the bottom of the conduction band, and $E_v$ the top of the valence band. Due to the very high value and due to the positive temperature coefficient of the electrical conductivity in the liquid phase as compared with the solid phase of a typical semiconductor system which increases of the order of about 15 times for germanium, the electrical conducton in the liquid semiconductor region 50, 51 is assumed to be metallic in nature. Referring to FIG. 7A, when solid 51, 52 is positive with respect to liquid 50, 51, electrons from the liquid region move to the conduction band $E_c$ of the solid semiconductor, each electron increasing in energy by $e$V electron volts where $$V=E_c-E_F$$

An increase in such energy by electrons flowing from the liquid to the solid must of necessity be equivalent to an absorption of heat. Similarly, holes moved from the solid material to the liquid from energy levels near $E_v$ in the solid, to the Fermi level $E_F$, in the liquid thereby decrease in energy by the amount $e(E_F-E_V)=e(E_G-V)$ in which $E_G$ is energy gap, and
V is the energy difference between the Fermi level and the conduction band expressed in volts so that holes in flowing from the solid to the liquid result in the generation of heat. Since, however, the material under study is of n-type conductivity there are many more electrons than holes so that the net effect is absorption of heat or Peltier cooling.

Conversely for a strongly p-type semiconductor, the Peltier coefficient should be negative due to the larger flow of holes. For an intrinsic semiconductor P should still be positive because of the higher mobility of electrons. From FIG. 7A it may be inferred that the Peltier coefficient P may approach a value of about one-half the energy gap $E_G$. The general form of the variation of P with V the energy difference between the bottom of the conduction band, $E_c$ and the Fermi level $E_F$ on the basis of FIG. 7A is shown in FIG. 7B. FIG. 7B is based on the approximate expression:

$$P=\frac{VI_n-(E_G-V)I_p}{I_n+I_p} \qquad (8)$$

in which $I_n$=electron current, and
$I_p$=hole current.

FIG. 7B is on coordinates of Peltier coefficient as the ordinate and V, the potential difference between the Fermi level and the bottom of the conduction band as the abscissa. It is seen from this figure that the Peltier coefficient P attains a value of 0 when $V$=about one-half $E_G$. The maximum values of Peltier coefficient P are equal respectively to approximately + and −0.3 volt and occur at the values of $V$=about 0.3 electron volt and about 0.4 electron volt, respectively.

In the considering FIGS. 7A and 7B it should be noted that the values of Peltier coefficient for the purpose of these figures is considered to be dependent only upon the differences in potential between the Fermi level and the top and the bottom of the conduction band. However, it is well know that a Peltier effect results upon the passage of a direct current through an interface between two different materials even if they are in the same phase. It is to be expected and it has, in fact, been observed that under some conditions the difference in concentration of a solute or solutes in the two phases of a semiconductor system has an influence on the value of the Peltier coefficient which outweighs that influence predictable on the basis of FIGS. 7A and 7B. It has been observed, for example, that the Peltier coefficient is negative for solid germanium against a liquid germanium alloy containing about 30 atomic percent of gold as it is for some other materials. See discussion in connection with FIGS. 6A and 6B.

Although this invention has been described primarily in terms of the processing of semiconductor systems, it is of course equally applicable to any system having sufficiently large values of Peltier coefficient and which is sufficiently conductive to carry a reasonable amount of current. For the purposes of this description, it is considered that a value of Peltier coefficient of 0.005, either positive or negative, is sufficient in the obtaining of an amount of heating or cooling sufficient to be of practical use in the processing of such materials. The maximum value of resistivity to be placed on materials capable of being processed in accordance with this invention is more difficultly ascribed since this value is related to the value of Peltier coefficient. It is suggested, however, that use of this invention should generally be limited to a processing of materials having a resistivity no greater than 10 ohm-centimeters. This value, of course, is intended to represent the resistivity value of the material undergoing treatment under the conditions of treatment; that is, the resistivity of the material at or near the temperature of the liquid-solid interface. This range of Peltier coefficients and resistivities includes all of the known extrinsic type semiconductor materials of interest in fabrication of semiconductor translating devices as well as a broad range of metallic and other systems. In this connection, it should also be noted that the value of Peltier coefficient in which interest is centered is the actual value at the interface between a molten and solid region. Such a value may be greater or less than the interphasal Peltier coefficient between liquid and solid phases of the pure materials in accordance with any effect had by any solute or solutes which may be present.

Although this invention has been described in terms of specific processes, it will be recognized by a person skilled in the art that the advantages of the use of Peltier currents as described herein are not so limited. It is intended that the following claims be construed in such manner as to include all such uses of Peltier currents.

What is claimed is:

In a process for treating material in which there is maintained at least one solid-liquid interface in the said material and in which the said material is such that its maximum resistivity in the solid phase at the melting point is 10 ohm-centimeters and its Peltier coefficient between the liquid and the solid phase at the said interface is at least 0.005 volt, passing both a direct current and an alternating current through the said solid-liquid interface, at least once varying the magnitude of the said direct current and varying the said alternating current simultaneously with the said direct current in such manner that the sum of the magnitudes of the said alternating current and direct current is maintained substantially constant.

References Cited in the file of this patent

UNITED STATES PATENTS 2,743,199 Hull et al. ............. Apr. 24, 1956

OTHER REFERENCES

Principles of Physical Metallurgy, Doan and Mable, 2nd edition, McGraw-Hill Book Co., Inc., New York 1941, page 82 relied on.